United States Patent
Dai et al.

(10) Patent No.: US 8,212,403 B2
(45) Date of Patent: Jul. 3, 2012

(54) CIRCUIT FOR CONTROLLING THE OPERATION OF A BACKUP POWER SUPPLY

(75) Inventors: Xiangjun Dai, Shenzhen (CN); Qingfei Zheng, Shenzhen (CN); Yaozhong Mi, Shenzhen (CN); Aimei Zhou, Shenzhen (CN)

(73) Assignee: BYD Company Ltd., Shenzhen (CN)

( * ) Notice: Subject to any disclaimer, the term of this patent is extended or adjusted under 35 U.S.C. 154(b) by 319 days.

(21) Appl. No.: 12/623,284

(22) Filed: Nov. 20, 2009

(65) Prior Publication Data

US 2010/0127569 A1 May 27, 2010

(30) Foreign Application Priority Data

Nov. 27, 2008 (CN) .................. 2008 2 0214026 U

(51) Int. Cl.
*H02J 9/00* (2006.01)

(52) U.S. Cl. ............. 307/64; 307/66; 320/128; 320/130
(58) Field of Classification Search .................. None
See application file for complete search history.

(56) References Cited

U.S. PATENT DOCUMENTS

| | | | | |
|---|---|---|---|---|
| 5,162,664 A | * | 11/1992 | Haun et al. | 307/64 |
| 6,011,323 A | * | 1/2000 | Camp | 307/64 |
| 6,815,843 B1 | * | 11/2004 | Kageyama | 307/42 |
| 2001/0017485 A1 | * | 8/2001 | Yoo | 307/66 |
| 2004/0262997 A1 | * | 12/2004 | Gull et al. | 307/64 |

* cited by examiner

*Primary Examiner* — Rexford Barnie
*Assistant Examiner* — Justen Fauth
(74) *Attorney, Agent, or Firm* — Morgan, Lewis & Bockius LLP

(57) ABSTRACT

The present invention provides a circuit for controlling the operation of a backup power supply, wherein the circuit comprises a switch unit, a control unit, and a processing unit; wherein the switch unit is configured to be operably coupled to an external power supply; wherein a first input terminal is configured to be operably coupled to a backup power supply, a second input terminal is configured to be operably coupled to the switch unit, the third and fourth output terminals of the control unit are configured to be operably coupled to an input terminal of the processing unit; the fifth and sixth input terminals of the control unit are configured to be operably coupled to a respective output terminal of the processing unit; and the control unit is configured to turn on and off the backup power supply.

11 Claims, 3 Drawing Sheets

CIRCUIT FOR CONTROLLING THE OPERATION OF A BACKUP POWER SUPPLY

CROSS REFERENCE TO RELATED APPLICATION

This application claims priority to and benefit of Chinese Patent Application No. 200820214026.6, filed on Nov. 27, 2008, the entire contents of which are incorporated herein by reference.

BACKGROUND OF THE INVENTION

1. Field of the Invention

The present invention relates to an electronic circuit field, in particular, relates to a circuit for controlling the operation of a backup power supply.

2. Background of the Related Art

For many types of electronic equipment, especially for those used in the telecommunication systems, the finance systems, and the internet servers etc., the interruption of power supply is not permitted. To guarantee a constant power supply without any interruption, the backup power supply must maintain sufficient energy for a long period of time. Normally, the secondary batteries are employed as a backup power supply, for example, the lead-acid batteries, the lithium-ion batteries and the energy batteries. The lithium-ion batteries and the energy batteries are configured in small size and high energy density, and are convenient for transportation.

However, the lithium-ion batteries and the energy batteries require multiple functional circuits for regular charging and discharging. When used as power supply source, the electric power is supplied to both the external electronic equipments and the internal functional circuits. Furthermore, such batteries continue to supply power to the internal functional circuits, even though they have stopped supplying power to the external electronic equipments. As a result, the backup power supply loses electric energy during the non-working mode, and may not work properly during emergency.

SUMMARY OF THE INVENTION

To solve the above problem, the present invention provides a circuit for controlling the operation of a backup power supply.

According to an embodiment of the invention, a circuit for controlling the operation of a backup power supply is provided, wherein the circuit comprises a switch unit, a control unit, and a processing unit; wherein the switch unit is configured to be operably coupled to an external power supply; wherein a first input terminal is configured to be operably coupled to a backup power supply, a second input terminal is configured to be operably coupled to the switch unit, the third and fourth output terminals of the control unit are configured to be operably coupled to an input terminal of the processing unit; the fifth and sixth input terminals of the control unit are configured to be operably coupled to a respective output terminal of the processing unit; and the control unit is configured to turn on and off the backup power supply.

According to another embodiment of the invention, a circuit for controlling the operation of a backup power supply further comprises a guiding unit configured to be operably coupled to the processing unit, a third output terminal and a forth output terminal of the control unit.

In one embodiment, the guiding unit comprises a first and a second diodes, an anode of the first diode is configured to be coupled to the third output terminal of the control unit, a cathode of the first diode is configured to be coupled to an input terminal of the processing unit, a anode of the second diode is configured to be coupled to the forth output terminal of the control unit, and a cathode of the second diode is configured to be coupled to the input terminal of the processing unit.

According to another embodiment of the invention, a circuit for controlling the operation of a backup power supply further comprises an energy storage unit configured to be operably coupled to the input terminal of the processing unit.

In one embodiment, the energy storage unit comprises a capacitor, wherein one end of the capacitor is configured to be operably coupled to the input terminal of the processing unit, and the other end of the capacitor is configured to be operably coupled to ground.

According to yet another embodiment of the invention, a circuit for controlling the operation of a backup power supply further comprises a DC-DC module configured to be operably coupled to the processing unit, the third output terminal and the forth output terminal of the control unit, respectively.

In some embodiment, the control unit comprises a first PMOS transistor, a second PMOS transistor, a first resistor, a second resistor, an optical coupler and the third MOS transistor; wherein a source terminal of the first PMOS transistor is configured to be operably coupled to an anode of the backup power supply via the first terminal of the control unit; a gate of the first PMOS transistor is configured to be operably coupled to a drain of the third MOS transistor; a drain of the first PMOS transistor is configured to be operably coupled to the processing unit via the third output terminal of the control unit; the first resistor is configured to connect the gate and the source terminal of the first PMOS transistor; a source terminal of the third MOS transistor is configured to be operably coupled to ground; a gate of the third MOS transistor is configured to be operably coupled to the processing unit via a fifth input terminal of the control unit; one input terminal of the optical coupler is configured to be operably coupled to the processing unit via a sixth input terminal of the control unit, the other input terminal of the optical coupler is configured to be operably coupled to ground; the second resistor is configured to connect the two output terminals of the optical coupler; one end of the second resistor is configured to be operably coupled to a source terminal of the second PMOS transistor, and the other end of the second resistor is configured to be operably coupled to a gate of the second PMOS transistor; the source terminal of the second PMOS transistor is configured to be operably coupled to the switch unit via the second terminal of the control unit; a drain of the second PMOS transistor is configured to be operably coupled to the processing unit via the forth output terminal of the control unit; and the gate of the second PMOS transistor is configured to be operably coupled to ground.

In some embodiment, the switch unit comprises an SPST (Single-Pole Single-Throw) switch.

In other embodiment, the processing unit comprises an MCU (Microprocessor Control Unit).

BRIEF DESCRIPTION OF THE DRAWINGS

Exemplary embodiments of the present invention will be described in detail based on the following figures, wherein.

DETAILED DESCRIPTION OF THE EMBODIMENTS

Figure 1:
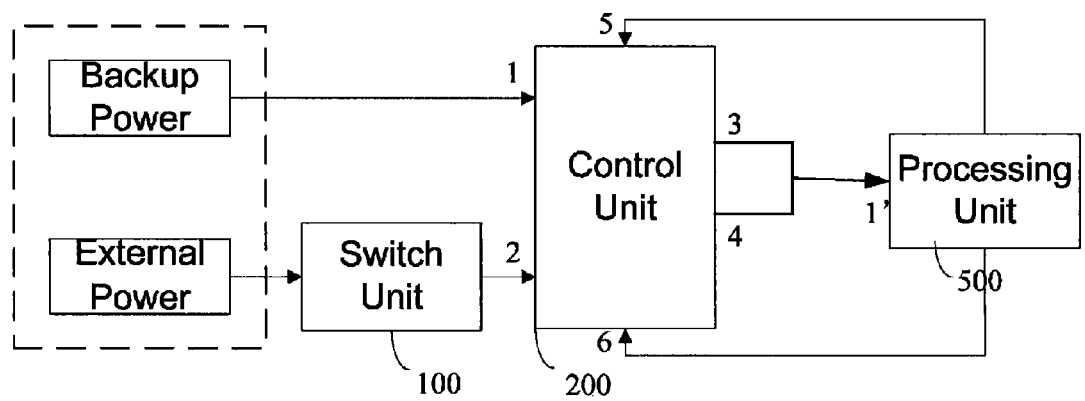
FIG. 1 shows a block diagram of a circuit for controlling the operation of a backup power supply according to EMBODIMENT 1.

As shown in FIG. 1, a backup power circuit comprises: a switch unit 100 configured to connect an external power supply; a control unit 200 comprising six terminals including a first terminal 1, a second terminal 2, a third output terminal 3, a forth output terminal 4, a fifth input terminal 5, and a sixth input terminal 6, wherein the first terminal 1 is configured to be operably coupled to a backup power supply, the second terminal 2 is configured to be operably coupled to the switch unit 100, and the rest terminals are configured to be operably coupled to a processing unit 500; and the control unit 200 is configured to turn on and off the backup power supply, an input terminal 1' of the processing unit 500 is configured to be operably coupled to the third output terminal 3 and the forth output terminal 4 of the control unit.

When the backup power does not supply power to the external electronic equipments, the processing unit 500 instructs the control unit 200 to shut down the backup power supply. Therefore, the constant energy loses due to charging an internal functional circuit may be eliminated.

Figure 2:
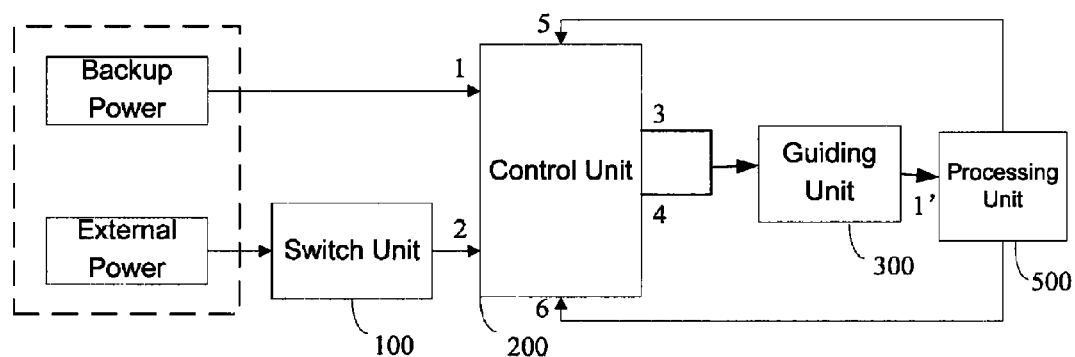
FIG. 2 shows a block diagram of a circuit for controlling the operation of a backup power supply according to EMBODIMENT 2.

As shown in FIG. 2, a backup power circuit comprises: a switch unit 100 configured to be operably coupled to an external power supply; a control unit 200 comprising six terminals including a first terminal 1, a second terminal 2, a third output terminal 3, a forth output terminal 4, a fifth input terminal 5, and a sixth input terminal 6, wherein the first terminal 1 is configured to be operably coupled to a backup power supply, the second terminal 2 is configured to be operably coupled to the switch unit 100, and the rest terminals are configured to be operably coupled to a processing unit 500; and the control unit 200 is configured to turn on and off the backup power supply, an input terminal 1' of the processing unit 500 is configured to be operably coupled to the third output terminal 3 and the forth output terminal 4 of the control unit; and a guiding unit 300 configured to be operably coupled to the input terminal 1', the third output terminal 3 and the forth output terminal 4.

The guiding unit 300 is employed to protect the backup power supply and the external power supply, in particular, to protect the backup power supply and the external power supply from being damaged by a reverse current.

Figure 3:
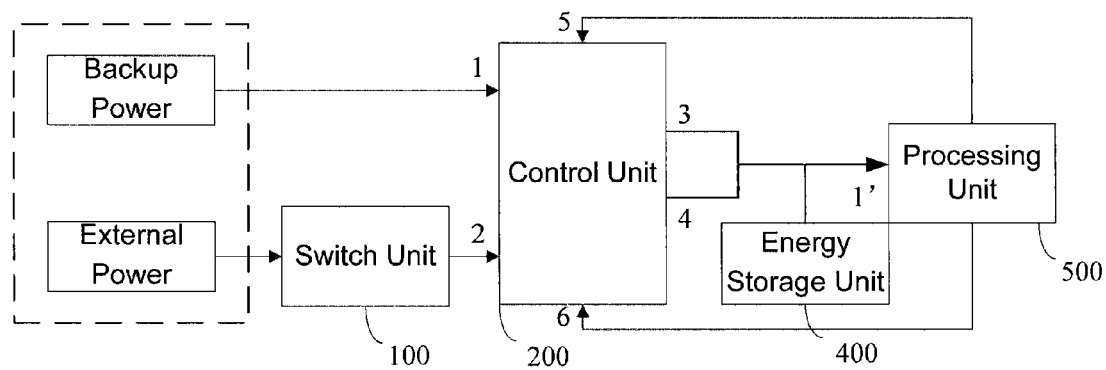
FIG. 3 shows a block diagram of a circuit for controlling the operation of a backup power supply according to EMBODIMENT 3.

As shown in FIG. 3, a backup power circuit comprises: a switch unit 100 configured to connect and disconnect an external power; a control unit 200 having six terminals including a first terminal 1, a second terminal 2, a third output terminal 3, a forth output terminal 4, a fifth input terminal 5, and a sixth input terminal 6, wherein the first terminal 1 is configured to be operably coupled to a backup power supply, the second terminal 2 is configured to be operably coupled to the switch unit 100, and the rest terminals are configured to be operably coupled to a processing unit 500; and the control unit 200 is configured to turn on and off the backup power supply, an input terminal 1' of the processing unit 500 is configured to be operably coupled to the third output terminal 3 and the forth output terminal 4 of the control unit; and an energy storage unit 400 configured to be operably coupled to the input terminal 1'.

When there is no external power supply and the backup power supply is shut down by the control unit 200, the energy storage unit 400 supplies a certain amount of power to the processing unit 500 to process data saving or backup. The energy unit 400 is employed to guarantee a regular operation of the backup power circuit, and further to protect the data from being damaged or lost by a power interruption.

Figure 4:
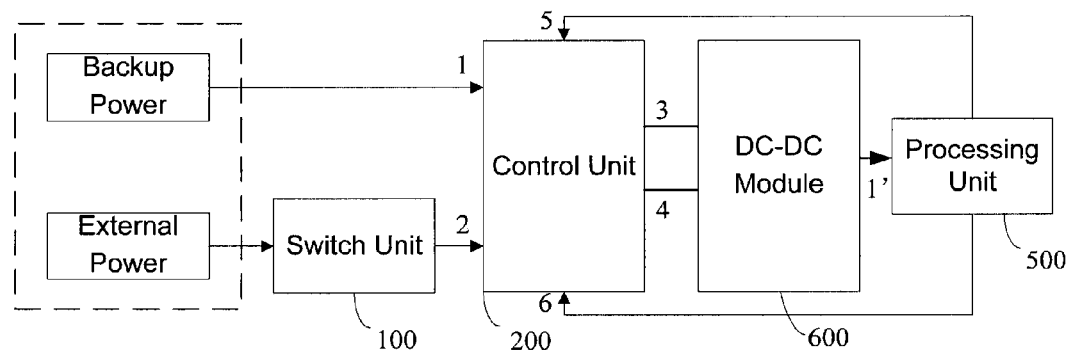
FIG. 4 shows a block diagram of a circuit for controlling the operation of a backup power supply according to EMBODIMENT 4.

As shown in FIG. 4, a backup power circuit comprises: a switch unit 100 configured to be operably coupled to an external power supply; a control unit 200 comprising six terminals including a first terminal 1, a second terminal 2, a third output terminal 3, a forth output terminal 4, a fifth input terminal 5, and a sixth input terminal 6, wherein the first terminal 1 is configured to be operably coupled to a backup power supply, the second terminal 2 is configured to be operably coupled to the switch unit 100, and the rest terminals are configured to be operably coupled to a processing unit 500; and the control unit 200 is configured to turn on and off the backup power supply, an input terminal 1' of the processing unit 500 is configured to be operably coupled to the third output terminal 3 and the forth output terminal 4 of the control unit; and a DC-DC module 600 configured to be operably coupled to the input terminal 1', the third output terminal 3 and the forth 4 terminal.

The DC-DC module 600 is employed to generate a stable voltage for the processing unit 500 by converting the input voltage from the backup power supply and the external power supply, and further to protect the processing unit 500 from being damaged by the unstable or exceeding voltage. By employing the DC-DC module, the backup power circuit in the present embodiment may not require high processing capability, thus the production cost may be reduced.

Figure 5:
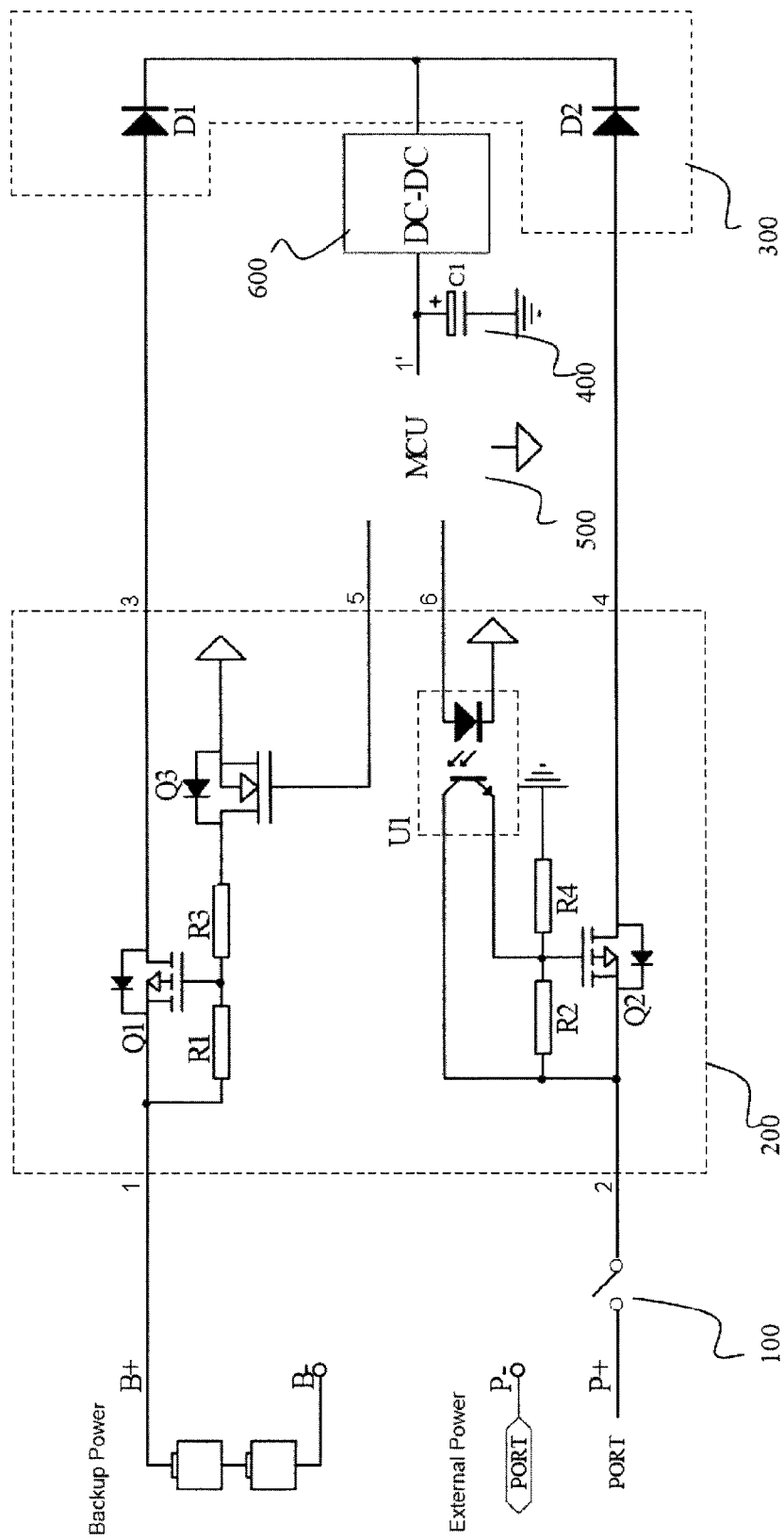
FIG. 5 shows a detailed circuit diagram of a circuit for controlling the operation of a backup power supply according to EMBODIMENT 5.

As shown in FIG. 5, a backup power circuit comprises: a switch unit 100; a control unit 200; a guiding unit 300; an energy storage unit 400; a processing unit 500; and a DC-DC module 600. The control unit 200 comprises six terminals including a first terminal 1, a second terminal 2, a third output terminal 3, a forth output terminal 4, a fifth input terminal 5, and a sixth input terminal 6. The processing unit 500 further comprises an input terminal 1'.

The switch unit 100 may be an SPST (Single-Pole Single-Throw) switch, or a relay switch. In this embodiment, the switch unit 100 is an SPST switch, wherein one end of the SPST switch is configured to be operably coupled to the external power supply, and the other end of the SPST switch is configured to be operably coupled to the second terminal 2.

In the present embodiment, the processing unit 500 is an MCU (Microprocessor Control Unit).

The guiding unit 300 comprises a first diode D1 and a second diodes D2, wherein an anode of the first diode D1 is configured to be coupled to the third output terminal 3 of the control unit 200, a cathode of the first diode D1 is configured to be coupled to a cathode of the second diode D2, an anode of the second diode D2 is configured to be coupled to the forth output terminal 4 of the control unit 200, and the cathode of the second diode D2 is configured to be coupled to an input end of the DC-DC module 600.

In the present invention, the energy storage unit 400 is a capacitor C1, wherein one end of the capacitor C1 is configured to be operably coupled to an output end of the DC-DC module 600, and the other end of the capacitor C1 is configured to be operably coupled to ground. The capacity of the capacitor C1 is configured to be greater than or equal to 47 microfarads. In the present embodiment, the capacity of the capacitor C1 is 47 microfarads.

The input end of the DC-DC module 600 is configured to be operably coupled to the cathodes of the first diode D1 and the second diode D2. The output end of the DC-DC module 600 is configured to be operably coupled to the input terminal 1' of the processing unit 500.

The control unit 200 comprises a first PMOS transistor Q1, a second PMOS transistor Q2, a first resistor R1, a second resistor R2, an optical coupler U1 and the third MOS transistor Q3; wherein a source terminal of the first PMOS transistor is configured to be operably coupled to an anode of the backup power supply via the first terminal of the control unit; a gate of the first PMOS transistor is configured to be operably coupled to a drain of the third MOS transistor; a drain of the first PMOS transistor is configured to be operably coupled to the processing unit via the third output terminal of the control unit; the first resistor is configured to connect the gate and the source terminal of the first PMOS transistor; a source terminal of the third MOS transistor is configured to be operably coupled to ground; a gate of the third MOS transistor is configured to be operably coupled to the processing unit via the fifth input terminal of the control unit; one input terminal of the optical coupler is configured to be operably coupled to the processing unit via the sixth input terminal of the control unit, the other input terminal of the optical coupler is configured to be operably coupled to ground; the second resistor is configured to connect two output terminals of the optical coupler; one end of the second resistor is configured to be operably coupled to a source terminal of the second PMOS transistor, the other end of the second resistor is configured to be operably coupled to a gate of the second PMOS transistor; the source terminal of the second PMOS transistor is configured to be operably coupled to the switch unit via the second terminal of the control unit; a drain of the second PMOS transistor is configured to be operably coupled to the processing unit via the forth output terminal of the control unit; and the gate of the second PMOS transistor is configured to be operably coupled to ground.

In the present embodiment, the control unit 200 further comprises a third resistor R3 and a forth resistor R4. One end of the third resistor R3 is configured to be operably coupled to the first resistor R1 and the gate of the first PMOS transistor Q1, and the other end of the third resistor R3 is configured to be operably coupled to the drain of the first PMOS transistor Q3. One end of the forth resistor R4 is configured to be operably coupled to the second resistor R2 and the gate of the second PMOS transistor Q2, and the other end of the forth resistor R4 is configured to be operably coupled to ground.

When the backup power supply does not supply power to the external electronic equipments and the SPST switch is turned off, the control unit 200 of the backup power circuit is configured to be operably coupled to the backup power supply via the first PMOS transistor Q1. Under such circumstance, the first PMOS transistor Q1 is in a status of non-conducted and the backup power supply does not supply power to the MUC and other functional circuits.

Furthermore, when the backup power does not supply power to the external electronic equipments and the SPST switch is turned off, the MCU drives the source and the drain of the third MOS transistor Q3 to a status of non-conducted, thus preventing a bleeder circuit from being formed between the first resistor R1 and the third resistor R3. Furthermore, because of no starting voltage to power on the first PMOS transistor Q1, the source and the drain of the first PMOS transistor Q1 are not conducted, and the power supply channel of the backup power supply is shut down.

When the backup power does not supply power to the external electronic equipments, the MCU shuts down the power supply channel of the backup power. At the same time, the MCU drives the optical coupler U1 to be closed, such that no starting voltage will be generated to power on the second PMOS transistor Q2. Accordingly, the source and the drain of the second PMOS transistor Q2 are not conducted, and the power supply channel of the external power supply is shut down as well. In the present embodiment, the capacitor C1 is capable of storing energy power for the MCU. Therefore, the MCU is protected from being damaged by the power interruption, and the energy waste is eliminated.

The diodes D1 and D2 may filter out the harmful reverse current to ensure the safety use of the backup power supply and the external power supply.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A circuit for controlling the operation of a backup power supply comprising:
    a switch unit having an input terminal and an output terminal;
    a control unit having, respectively, first input terminal, second input terminal, third output terminal, fourth output terminals, fifth input terminal, and sixth input terminal; and
    a processing unit having an input terminal and one or more output terminals;
    wherein
    the input terminal of the switch unit is configured to be operably coupled to an output terminal of an external power supply;
    the first input terminal of the control unit is configured to be operably coupled to an output terminal of a backup power supply;
    the second input terminal of the control unit is configured to be operably coupled to the output terminal of the switch unit;
    the third and forth output terminals of the control unit are, respectively, configured to be operably coupled to the input terminal of the processing unit;
    the fifth and sixth input terminals of the control unit are, respectively, configured to be operably coupled to a respective output terminal of the processing unit; and
    the control unit is configured to turn on and off the backup power supply,
    wherein the control unit further comprises a first PMOS transistor, a second PMOS transistor, a first resistor, a second resistor, an optical coupler and a third MOS transistor; wherein
        a source terminal of the first PMOS transistor is configured to be operably coupled to an anode of the backup power supply via the first input terminal of the control unit;

a gate of the first PMOS transistor is configured to be operably coupled to a drain of the third MOS transistor;

a drain of the first PMOS transistor is configured to be operably coupled to the input terminal of the processing unit via the third output terminal of the control unit;

the first resistor is configured to couple the gate of the first PMOS transistor to the source terminal of the first PMOS transistor;

a source terminal of the third MOS transistor is configured to be operably coupled to the ground;

a gate of the third MOS transistor is configured to be operably coupled to an output terminal of the processing unit via a fifth input terminal of the control unit;

a first input terminal of the optical coupler is configured to be operably coupled to an output terminal of the processing unit via the sixth input terminal of the control unit, and a second input terminal of the optical coupler is configured to be operably coupled to the ground;

the second resistor is configured to be operably coupled with two output terminals of the optical coupler;

one end of the second resistor is configured to be operably coupled to a source terminal of the second PMOS transistor, the other end of the second resistor is configured to be operably coupled to a gate of the second PMOS transistor;

the source terminal of the second PMOS transistor is configured to be operably coupled to the switch unit via the second input terminal of the control unit;

a drain of the second PMOS transistor is configured to be operably coupled to the input terminal of the processing unit via the forth output terminal of the control unit; and the gate of the second PMOS transistor is configured to be operably coupled to the ground.

2. The circuit of claim 1, wherein the processing unit is configured to control the control unit for turning on and off the backup power supply.

3. The circuit of claim 1, further comprising a guiding unit, wherein the guiding unit is configured to be operably coupled to the third and forth output terminals of the control unit, respectively, and the input terminal of the processing unit.

4. The circuit of claim 3, wherein the guiding unit comprises a first diode, wherein an anode of the first diode is configured to be operably coupled to the third output terminal of the control unit; and a cathode of the first diode is configured to be operably coupled to the input terminal of the processing unit.

5. The circuit of claim 4, wherein the guiding unit comprises a second diode, wherein an anode of the second diode is configured to be operably coupled to the forth output terminal of the control unit; and a cathode of the second diode is configured to be operably coupled to the input terminal of the processing unit.

6. The circuit of claim 1, further comprising an energy storage unit configured to be operably coupled to the input terminal of the processing unit.

7. The circuit of claim 6, wherein the energy storage unit comprises a capacitor, wherein one end of the capacitor is configured to be operably coupled to the input terminal of the processing unit, and the other end of the capacitor is configured to be operably coupled to the ground.

8. The circuit of claim 7, wherein the capacity of the capacitor is configured to be greater than or equal to 47 microfarads.

9. The circuit of claim 1, further comprising a DC-DC module wherein the DC-DC module is configured to be operably coupled to the input terminal of the processing unit and the third and forth output terminals of the control unit, respectively.

10. The circuit of claim 1, wherein the switch unit comprises an SPST (Single-Pole Single-Throw) switch.

11. The circuit of claim 1, wherein the processing unit comprises an MCU (Microprocessor Control Unit).

* * * * *

UNITED STATES PATENT AND TRADEMARK OFFICE
CERTIFICATE OF CORRECTION

PATENT NO.        : 8,212,403 B2
APPLICATION NO.   : 12/623284
DATED             : July 3, 2012
INVENTOR(S)       : Dai et al.

It is certified that error appears in the above-identified patent and that said Letters Patent is hereby corrected as shown below:

In Column 1, line 65, please delete "forth" and add -- fourth --;
In Column 2, line 4, please delete "forth" and add -- fourth --;
In Column 2, line 22, please delete "forth" and add -- fourth --;
In Column 2, line 53, please delete "forth" and add -- fourth --;
In Column 3, line 21, please delete "forth" and add -- fourth --;
In Column 3, line 29, please delete "forth" and add -- fourth --;
In Column 3, line 40, please delete "forth" and add -- fourth --;
In Column 3, line 49, please delete "forth" and add -- fourth --;
In Column 3, line 52, please delete "forth" and add -- fourth --;
In Column 3, line 61, please delete "forth" and add -- fourth --;
In Column 4, line 3, please delete "forth" and add -- fourth --;
In Column 4, line 17, please delete "forth" and add -- fourth --;
In Column 4, line 26, please delete "forth" and add -- fourth --;
In Column 4, line 29, please delete "forth" and add -- fourth --;
In Column 4, line 43, please delete "forth" and add -- fourth --;
In Column 4, line 59, please delete "forth" and add -- fourth --;
In Column 5, line 39, please delete "forth" and add -- fourth --;
In Column 5, line 43, please delete "forth" and add -- fourth --;
In Column 5, line 48, please delete "forth" and add -- fourth --;
In Column 5, line 50, please delete "forth" and add -- fourth --;
In Column 6, line 52, please delete "forth" and add -- fourth --;
In Column 7, line 34, please delete "forth" and add -- fourth --;
In Column 8, line 3, please delete "forth" and add -- fourth --;
In Column 8, line 15, please delete "forth" and add -- fourth --;
In Column 8, line 33, please delete "forth" and add -- fourth --.

Signed and Sealed this
Fourteenth Day of August, 2012

David J. Kappos
*Director of the United States Patent and Trademark Office*